Figure 1:
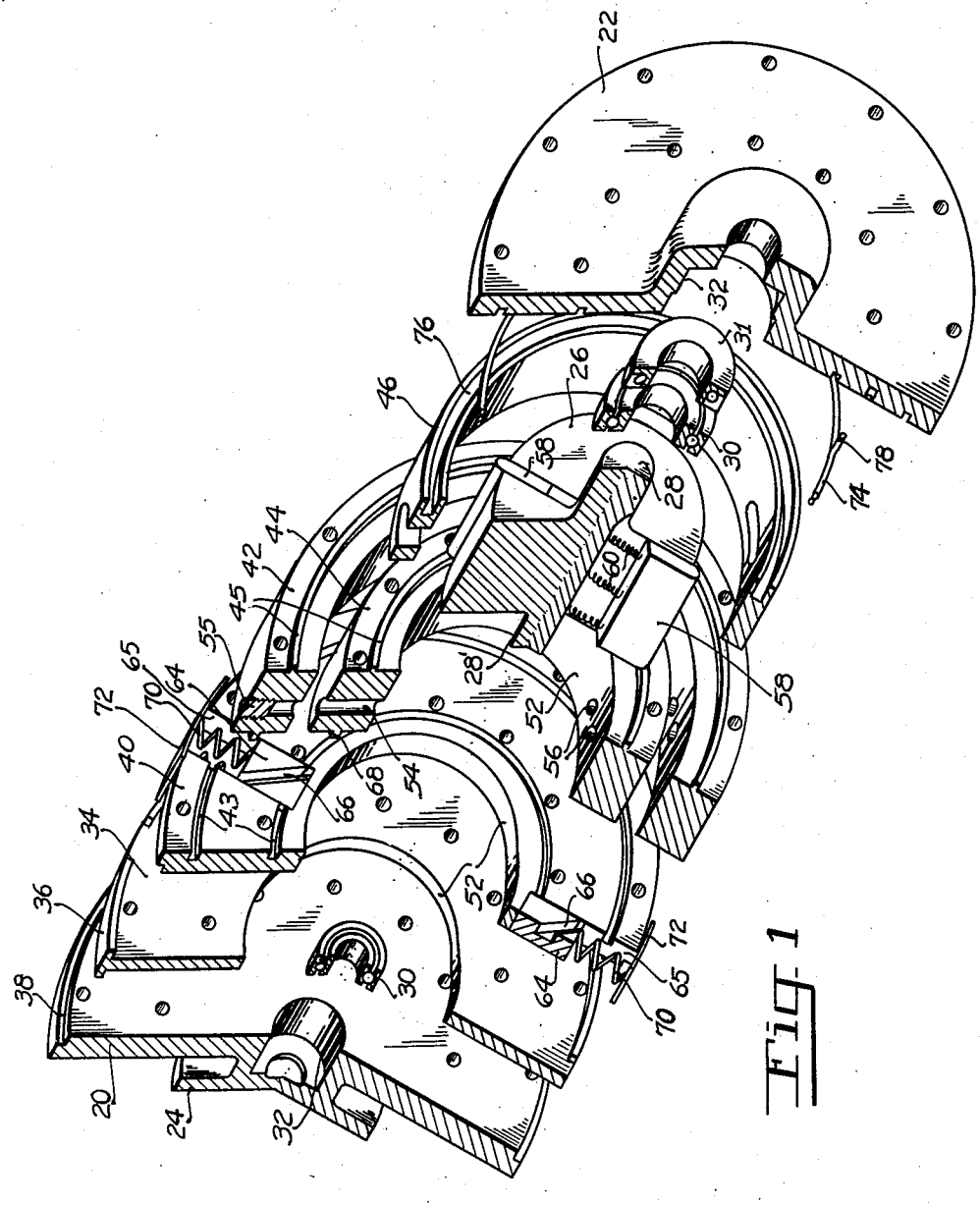

Oct. 17, 1950  R. VAN ALSTYNE ET AL  2,526,175
FLUID DRIVE MECHANISM

Filed Feb. 24, 1948  5 Sheets-Sheet 1

INVENTOR.
ROY VAN ALSTYNE
EDGAR J. ROTHCHILD
BY
Reynolds & Beach
ATTORNEYS

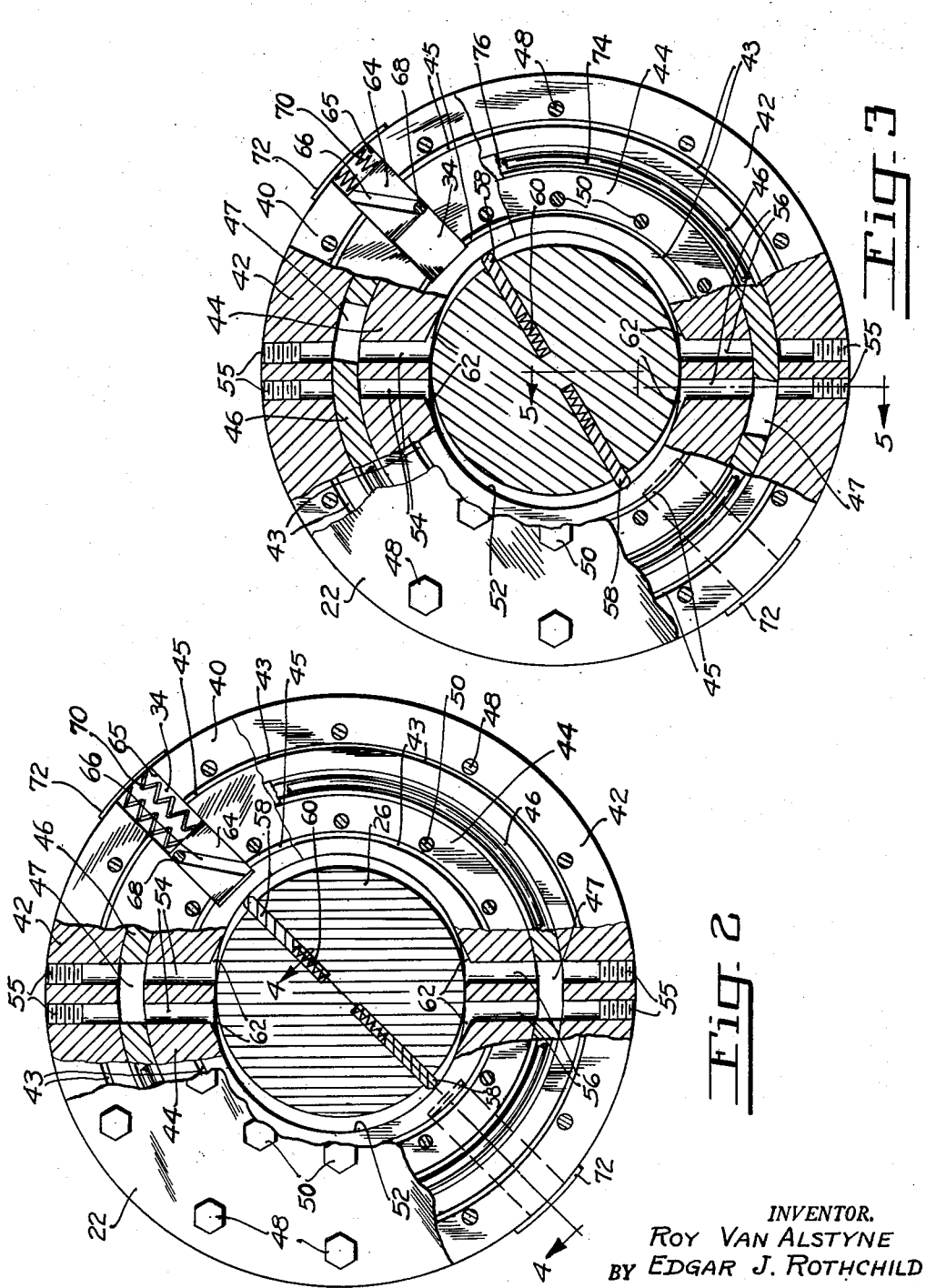

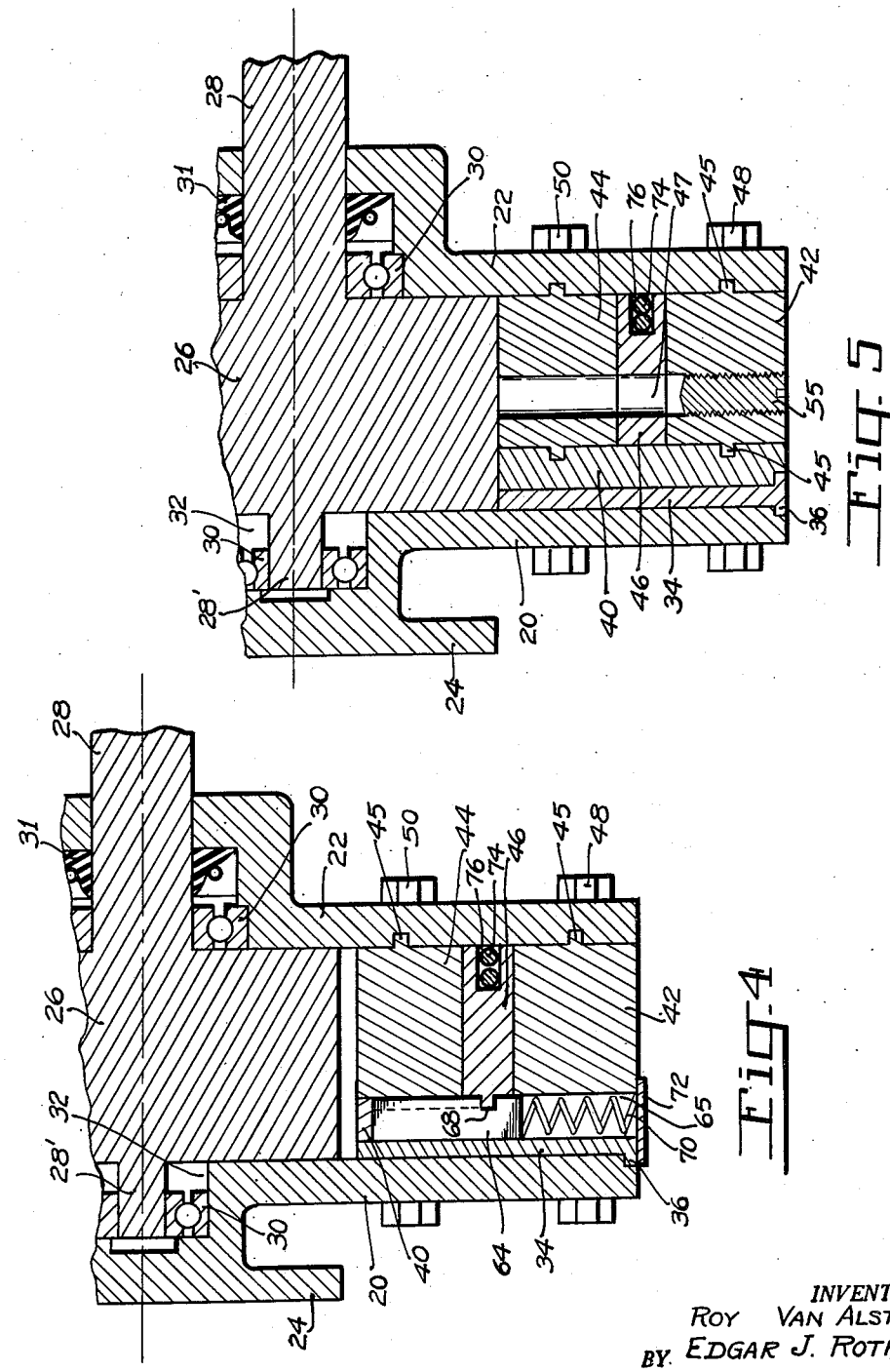

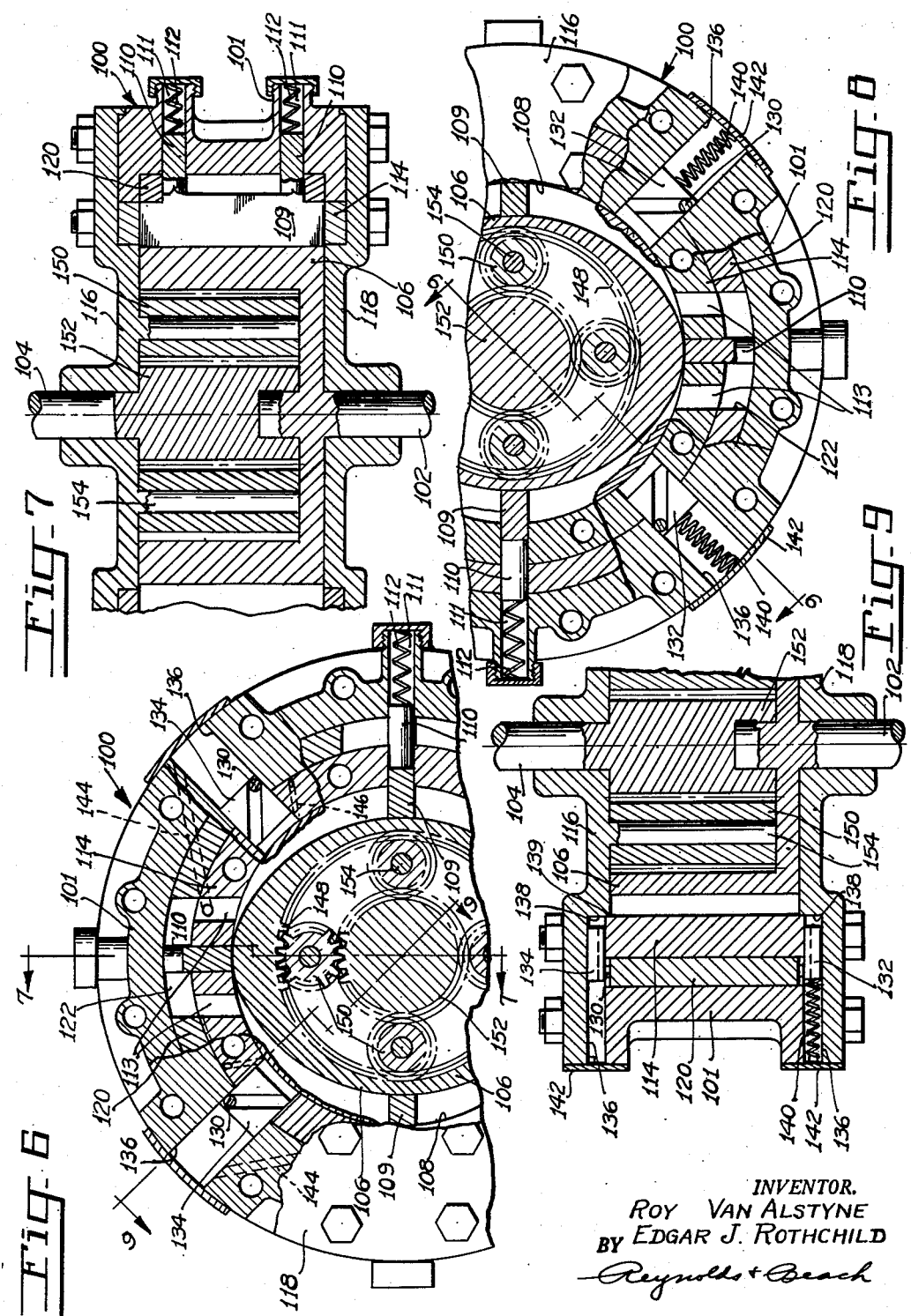

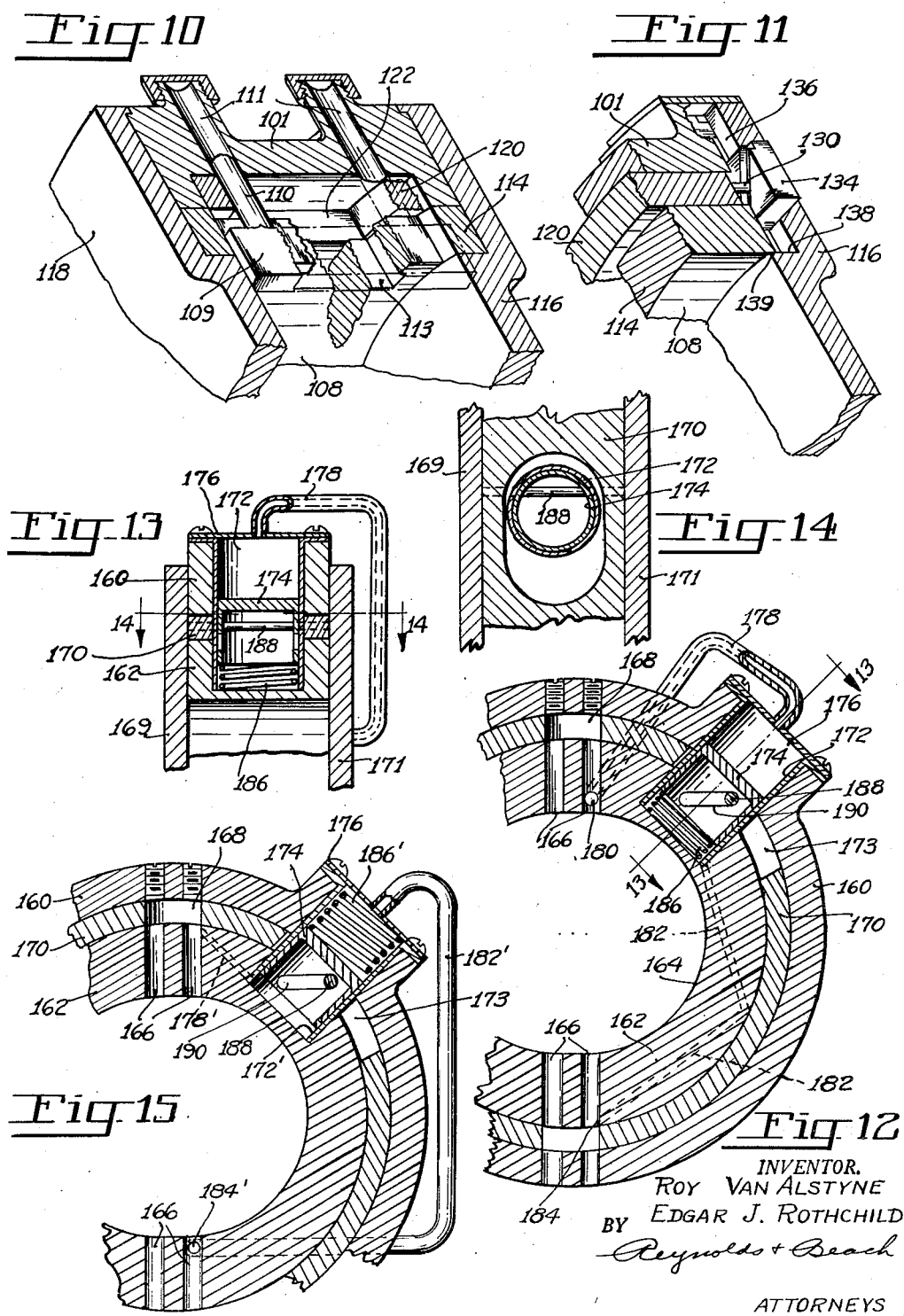

Patented Oct. 17, 1950

2,526,175

UNITED STATES PATENT OFFICE 2,526,175

FLUID DRIVE MECHANISM

Roy Van Alstyne and Edgar J. Rothchild, Seattle, Wash.; said Van Alstyne assignor to said Rothchild Application February 24, 1948, Serial No. 10,216

17 Claims. (Cl. 192—58)

This invention relates to improvements in fluid coupling devices, and more particularly to such devices having facility for selectively or automatially varying the degree of coupling in a controlled manner. By degree of coupling or coupling ability is meant the ability of a particular coupling device to transmit torque to the coupling output or load shaft, which affects the relative speeds of the input and output members. The term "slip" is commonly used to designate the relative rotative speeds of the input and output members in terms of percentage differences, and is definitely related to their drive ratio. Ordinarily the lower the degree of coupling of a device the greater will be the slip for given load conditions. In a simple type of fluid coupling, the dynamic characteristics of the device are fixed, that is, the variation in slip under varying conditions of load and prime mover speed will be predetermined, the degree of coupling being constant, and a function of the quantity and viscosity of the fluid, the proximity of impeller and runner, etc. In accordance with our invention the coupling device may be controlled to vary the degree of coupling selectively in order to meet different operating requirements of a prime mover and load or other coupled apparatus.

A simple fluid coupling can have but restricted application. One of its shortcomings is the maintenance of its degree of coupling at times when the output shaft is stationary and the prime mover idling, when no coupling is desired. If features of the device are changed to reduce its degree of coupling when the output member is stationary, the degree of coupling under normal operating conditions is correspondingly lowered. This is undesirable normally since the drive and load shafts are intended to rotate at nearly the same operating speeds. In terms of slip, a simple coupling operating at normal speed and load can be expected to have approximately a few percent slip.

Concretely, while a conventional hydraulic coupling can be applied, despite the foregoing difficulty, in the transmission of power in applications where the idling engine speed is comparatively low, resulting in energy losses which are small and can be tolerated, it is very inefficient in applications where idling speed is high, or where it is desired that the speed of the power input member be relatively high as compared to the speed of the power output member, for low-speed, high-torque operation of the latter. With the load or output shaft stationary or moving slowly under heavy load and the prime mover turning rapidly, large losses of power are developed and consumed in the coupling itself, appearing in the form of heat losses resulting from shock, eddying and friction of the fluid. Cooling problems arise in such mechanism, to dissipate the heat thus produced. Even in modern automobiles with comparatively low engine idling speeds the engine must labor and a brake of some kind be applied to prevent the vehicle creeping, unless gear shifting mechanism, for example, is employed ahead of the coupling to reduce the engine speed.

Generally, in a great many varied instances where power is transmitted by fluid couplings the requirement is imposed that a shaft be driven normally at substantially constant speed and be frequently brought from rest to that speed, oftentimes under conditions of variable loading. It may be preferable for the speed of the prime mover to be held subsantially constant during the process of bringing the speed of the load to its normal operating value.

Such constant speed of the driven shaft must be nearly the same speed as that of the impeller or input shaft, to secure reasonable driving efficiency, yet such speed must be relatively high to prevent overloading the prime mover or reducing substantially the maximum power which it can develop. With a coupling device having a fixed degree of coupling the result is sometimes to cause the prime mover to stall. In most such cases, unless a torque converter is utilized, the operation may not be all that is to be desired. By way of example, in a motor driven vehicle, while the idling torque problem may in some cases be relatively insignificant because of low engine idling speed, the operation cannot be efficient under various other and changing driving conditions, such as when climbing hills, accelerating, etc., with a simple fluid coupling, and when employing gear shifting devices in conjunction with such a coupling to provide different torque ratios, interruptions or breaks in the transmission of power occur while effecting changes in drive ratio.

In the past, variable coupling-control arrangements have been proposed to alter the degree of coupling, following generally two distinct patterns. In one type, quantities of fluid are drained from the fluid casing, or added, between impeller and runner, as may be required to establish any desired degree of coupling. Hence, in applications where the idling speed of a prime mover is high the fluid would be drained substantially completely from the casing to reduce the idling power losses in the coupling to zero. In the second general type of device referred to, and the type to which the present invention relates, the volume of fluid remains unchanged but its path of action between impeller and runner is restricted or relieved by suitable control means such as deflectors, by-pass valves, shutters, or the like.

An important object of our invention is to provide a compact, rugged and inexpensive variable fluid coupling of the valve-controlled type, having a wide range of variation in its degree of coupling from substantially zero coupling to a maximum value which is preferably higher than that which can be tolerated in a conventional coupling device because of slip losses under idling conditions or the like.

A further object of the invention is to provide efficient by-pass valve means contained wholly within the fluid casing, thereby minimizing the problem of fluid leakage externally, which valve means are operable to control fluid driving pressure or transmitted forces developed between opposing impeller and runner surfaces, and to effect such operation in accordance with a dynamic operation condition of the coupling, such as centrifugal force at the speed of impeller or runner, or such as loading or compression of the fluid in transmitting torque, or a combination of these factors.

More specifically, it is an object, for example, to utilize centrifugal force generated by rotation of the runner or impeller, and/or the loading or compression of the fluid, to actuate means operable to regulate the degree of coupling in such manner as to maintain high coupling efficiency under varying operating conditions, or to produce the desired speed transformation ratio as between prime mover and load shafts.

Still another object of the invention is to provide a device incorporating self-contained speed-reducing means enabling the further reduction of energy losses in the coupling when the prime mover is idling, or the output member is moving slowly under heavy load, without sacrificing the advantage of obtaining a high degree of coupling under normal operating conditions.

In the type of fluid coupling upon which the illustrated forms of the invention are based, but which are not necessarily the only usable forms for certain of its purposes, impeller and runner members are provided with one forming a cylindrical enclosing wall within which the other is mounted for rotation about an axis which preferably coincides with the cylinder axis. The cylindrical inner wall of the outer member may be ovate in form, in which case the inner member has radial vanes which extend and contract to slide continuously over the wall surface as they rotate, or such cylindrical wall may itself carry such vanes which bear on the opposing surface of the inner member which will then be of right ovate cylindrical form. In either case coupling occurs by force of the fluid in being driven by parts of the impeller against surface areas of the runner interposed in the fluid's path. The degree of coupling will depend upon the amount of pressure of the fluid which can, under a given set of conditions, be developed in this manner, and it is by the use of fluid by-passes and valves that we are able to relieve in controlled manner such developed pressures to control the degree of coupling of our device.

A principal feature of the invention comprises a ring valve arrangement, which valve is shiftable circumferentially to open or close fluid ports located in the circulatory path of the fluid, to allow passage of fluid in controlled volume from high pressure to low pressure areas developed as the impeller rotates. The valve ring ports are moved progressively into registery with the valve passages to control fluid flow.

A related feature of the invention resides in valve-actuating mechanism comprising slides contained preferably within the casing, which move inwardly and outwardly radially of the casing to shift the valve ring circumferentially. In one form of our device, a slide is moved outwardly by centrifugal force proportional to the rotational speed of the casing, carrying the impeller, against the force of a spring, thereby tending to move the valve ring gradually to close the valve passages, which are open at low impeller speeds. In another form fluid pressures govern slide and thereby valve positioning; and a combination of both types of control is also illustrated, as applicable in cases where the prime mover is to be protected against overload while efficient coupling is maintained at various speeds.

More specifically, the valve actuating means may employ slides, comprising piston means, and coacting cylinder means, the cylinder communicating at its opposite ends with the main body of fluid between the impeller and runner, at differential pressure points, such as adjacent to or in the valve inlet and outlet passages, respectively. In one arrangement the pistons are moved solely in accordance with fluid pressure working against the force of springs, whereas in another form their controlling effect is modified by centrifugal force determined by impeller speed.

A further feature resides in a controlled coupling device, such as of one of the foregoing described types, and additionally a speed reducer included within the fluid casing, such as in the form of a planetary gear system, is integrated with the fluid coupling between the input and output shafts. For example, the spider carrying the orbitally moving planet gears may be carried directly by the casing, acting as impeller, for their orbital movement between the ring gear and the sun gear, the latter being connected to the input shaft. The outer or ring gear may be integral with the rotor, acting as the runner, and the ring gear connected preferably directly with the output shaft.

These and further aspects and advantages of our invention are described hereinafter by reference to the accompanying drawings which illustrate preferred forms of our improved fluid coupling.

Figure 1 is an exploded isometric view of one preferred form of our coupling device, showing the parts in section and separated along the common axis of the input and output shafts for convenience of illustration; Figure 2 is an end elevation view of the same, with parts broken away, showing the control valve open; Figure 3 is a similar end elevation view, showing the valve closed; Figure 4 is a fragmentary axial sectional view of the device taken along the section 4—4 of Figure 2, showing particularly the valve actuator details; and Figure 5 is a similar view taken along the line 5—5 of Figure 3, showing particularly the valve details.

Figure 6 is an end elevation view of a modified form of our coupling device, with parts broken away in sections, and showing particularly the details of a fluid-pressure valve-actuating arrangement; Figure 7 is a fragmentary axial sectional view of the same, taken along section line 7—7 of Figure 6, showing particularly the vane details and gear connections; Figure 8 is an end elevation view similar to Figure 6 but with different sectional showings, particularly illustrating the detail of a centrifugally operated, valve-actuating arrangement in combination with the fluid-pressure arrangement of Figure 6; Figure 9 is a fragmentary axial sectional view similar to that of Figure 7, but taken along section line 9—9 of Figure 8, to illustrate the combined valve-actuating arrangement just referred to; Figure 10 is a fragmentary isometric view showing the detail of a vane assembly, with parts shown in section; and Figure 11 is a similar view showing particularly the connection between the valve-actuating means and the valve ring.

Figure 12 is a fragmentary transverse sectional view of a further modified form of our coupling device, having a different type of fluid-pressure valve-actuating arrangement; Figure 13 is a detail sectional view taken along section line 13—13 of Figure 12, showing the valve-actuating means; and Figure 14 is a detail sectional view of the same valve-actuating means taken along section line 14—14 of Figure 13.

Figure 15 is a fragmentary transverse sectional view of a further modified form of our coupling device wherein a still different type of fluid-pressure valve-actuating arrangement is employed.

The form of our improved coupling shown in Figures 1 to 5 is perhaps its simplest form. Here, the end walls of the cylinder casing are formed by the two oppositely disposed end-plates 20 and 22. Preferably, the fluid casing is designed to function operatively as the impeller, although in certain applications it may act as the runner, as will be show subsequently herein. Accordingly, end plate 20, for example, has a driving flange 24 which may be coupled directly to the output shaft of a prime mover, such as an automobile engine (not shown).

Located centrally within the casing coaxially with and between end plates 20 and 22, a right circular cylindrical rotor member 26, comprising the device's runner, derives torque by means of the fluid reacting between vanes carried by it and the rotating casing, for driving the output or load shaft 28 integrally connected to the rotor and extending to the load (not shown) through the central aperture in one of the end plates, such as plate 22. A short, coaxial section of shaft 28' projects from the opposite side of the rotor, and the rotor is thus supported for free rotation relative to the casing upon this and the load shaft, mounted in ball bearings 30 received in journal boxes or recesses 32 formed in end plates 20, 22. Suitable packing 31 may be provided in the journal boxes of end plate 22 to prevent leakage of fluid through the end plate aperture around the shafts 28.

The body of the casing is completed by a series of various ring-like members bolted together in coaxial, stacked relationship between the end plates 20, 22. As will be seen, their alignment between the end plates is perfected by means of concentric annular grooves and interfitting, concentric annular locating flanges or shoulders respectively formed on the adjacent sections, which become mutually engaged when the parts are assembled. Thus, pressed tightly against the inner face of end plate 20, the flat, apertured spacer disc 34 is located, with one side of its outer, circumferential double-sided locating flange 36 fitting over the inset shoulder 38 formed in and about the outer edge of end plate 20. The other side of flange 36 is similarly received in a corresponding inset shoulder formed in the peripheral edge of the succeeding annular, apertured disc 40 tightly abutting disc 34.

In turn disc 40 is closely abutted on its opposite side by a pair of radially spaced, concentric ring-like members 42 and 44, each of which has circular locating flanges or tongues 45 projecting from its sides laterally into correspondingly located receiving grooves 43 formed in the adjacent face of disc 40. The members 42 and 44 are thereby held in definite radially located positions concentrically of the assembly, with an annular space between them. In this annular space, valve ring 46 is fitted snugly, enabling it to be rotated freely with a close sliding fit. The valve ring is located axially between disc 40 and the end plate 22, which is clamped tightly against the outside face of the ring-like members 42 and 44 in a transverse location determined by a tongue and groove arrangement, similar to that by which they engage disc 40.

The interfitting rib-and-groove system of locating the casing parts serves the additional function of preventing leakage of oil or other fluid contained within the casing, and, if necessary to effect a better seal, the locating grooves or recesses may be suitably packed. Generally, therefore, the casing, made up of such a series of parts, presents a compact, rugged whole clamped together rigidly between the end plates by groups of bolts 48 and 50, extending longitudinally through and between the end plates and through the various intervening parts. Bolts 50, arranged in an inner circle concentric with the casing, pass through inner ring member 44, while the bolts 48 of the outer group pass through outer ring member 42.

A central cavity or bore 52 extending the length of the casing between the end plates, formed by the registering apertures of the several rings including member 44, receives the rotor 26. In accordance with the illustrated relation of the opposing runner and impeller surfaces, the bore surface is of generally elliptical or ovate cross section whereas the rotor is of circular cross section, although the rotor is not limited to that shape, the important consideration being that it carries sliding vanes engaging the casing cavity. As illustrated in subsequently described forms, the reverse arrangement may be employed, with the bore surface of circular cross section. In each case the smallest ellipse radius of the elliptical surface, and the radius of the circular surface are approximately equal, the minimum spacing between the surfaces, occurring along diametrically opposite elemental lines of the cylindrical surfaces, being small and becoming enlarged toward quadrature locations at the major axis of the ellipse. Hence, in all relative positions of the rotor (runner) and casing (impeller) two oppositely disposed crescent-shaped fluid spaces are formed between runner and impeller surfaces (Figs. 2 and 3).

From whichever of these two opposing surfaces is circular, the rotor in Figs. 2 and 3, vanes 58 project radially into and across the crescent-shaped spaces, dividing these spaces into sectors which vary in shape and size as the rotor and impeller rotate relatively. Two such vanes are employed in the illustrated form of Fig. 1, but more may be used depending upon the lobes which the cavity has. Such lobes should be spaced equally and the rotor vanes should be spaced correspondingly. Even a single lobed cavity, which may be of circular cross section, could be used with a single vaned rotor, but a more balanced construction results with the device shown. These vanes are received in the radial slots formed in the body of the rotor member carrying them, and are urged by outwardly acting springs 60 into sliding contact with the opposing impeller surface to partition the sectors into separate fluid chambers. These chambers can communicate only through by-pass passages located in the casing to interconnect adjacent lobes of the cavity. In the instance of Figs. 2 and 3, except for the diametrically opposite pairs of valved by-pass passages 54, 56 formed by bores extending radially through ring member 44, the bore's surface is smooth and uninterrupted. The outer ends of these bores are plugged by threaded plugs 55, which may be removed for replenishing or draining fluid from the casing. As the members rotate relatively, the vanes slide in and out periodically to accommodate the variation in spacing between the opposing surfaces, and they confine the fluid within the cavity sectors behind them, respectively, in the direction of casing rotation, so that the fluid is forced circumferentially of the casing and through the by-pass passages from one cavity lobe to the next in the direction opposite the casing rotation.

It will be evident, therefore, that the resulting tendency of the casing's rotation is to press the fluid cyclically against the rotor's vanes, crowding it toward and into the tapered end portions of the crescent sectors of the cavity, which results in the development of high pressures. To the extent that such pressures are unrelieved by free flow of fluid through the by-pass bores as they develop, a corresponding reactive force becomes exerted on the runner, causing it to rotate. Obtaining fluid coupling in this manner, by the use of an ovate cavity housing a sliding vane rotor, generally is old. The present invention is concerned with the manner of controlling the degree of force thus developed by pressure of the fluid against the runner as produced by the impeller, by the artful use of by-pass control valves operatively adjusted automatically by changing conditions in the coupling, as a means of imparting selected dynamic coupling characteristics to the device.

The control mechanism, by which the degree of coupling is governed, operates by adjusting valves regulating the fluid flow through the diametrically opposed pairs of bores 54, shown in Figs. 3 and 4, extending radially outwardly from the inside of the casing through ring members 44 and 42, which function as valved passages. The bores 54 of a pair are spaced by equal amounts circumferentially on either side of the minor diametral plane of the elliptical inner surface of the casing. One of these bores of each pair acts as a by-pass intake and the other as a by-pass outlet, depending upon the direction of relative rotation of the impeller and runner. Since the mechanism is completely symmetrical about such diametral plane it is reversible without modification. The spacing is not critical but should be sufficient for structural purposes. A relatively small spacing is possible, since, if necessary to do so, and as shown, a flared circumferential channel or throat 62 may be provided in the casing wall, leading into each valve passage to provide unrestricted passage for fluid flowing between the passages and adjoining ends of the crescent-shaped fluid spaces.

The valve ring 46, interposed between parts 42 and 44, intercepts the bores 54, and has slots 47 at diametrically opposite locations corresponding to the locations of such bores. As illustrated in Fig. 2, the circumferential length of the slots is sufficient to enable fluid to pass freely through each valve slot between the bores of each pair when the valve ring is positioned with its slots and the valve passage bores in registry. Consequently by shifting the valve ring rotatively the exchanger of fluid through the valve bores may be restricted to a greater or lesser extent or even cut off entirely, as shown in Fig. 3, thereby selectively to regulate the development of fluid pressure behind the vanes, the casing being the externally driven element, and, it follows, to increase or decrease the degree of fluid coupling between impeller and runner. The valve ring with slots thereby act conjunctively with the radially bored casing, to constitute valve mechanism.

No special problem is entailed in sealing the casing against fluid leakage externally around any part of the valve since no valve parts project outwardly of the casing. Moreover, as will later be described further, the preferred valve actuating mechanisms are likewise of a type which conveniently may be contained wholly within the casing.

In the form of coupling presently under consideration the valve ring is rotated operatively by radial movement of one or more blocks 64 received slidably in radial slots or recesses 65 in disc 40, as shown in Figs. 1 and 4, which slots open in the plane of its outer peripheral surface and are equal depth. The slides are each grooved correspondingly at 66, along diagonal lines in the side faces adjacent to the valve ring 46, and the latter has one or more nubs 68, one projecting into each such diagonal groove, where it is free to slide lengthwise of the groove, and in so doing, by movement of the slide blocks, shifting the rotative position of the valve ring.

Normally, with the casing, constituting the impeller, stationary, or rotating at relatively low angular speed, the slides are held in their inmost positions against the bases of their respective slots by springs 70 reacting between the outer ends of the slides and the retaining caps 72 covering the slot end openings. In this position, the valve ring nubs are held at one end of their travel in grooves 66, in which position the valve is effectively held open in the disposition of Fig. 2. As the impeller rotates more rapidly, the centrifugal forces developed urge the slides radially outwardly in their slots against the forces of springs 70. Such radial movements of the slides produces a wedging action on the valve ring because of the inclination of the slide grooves 66, which effects progressive rotative shifting of such valve ring, gradually closing the connection between the by-pass passages 54 of each pair through the valve ring slots 47 as rotational speed increases, and reversing the process, because of the action of the springs 70, as speed decreases.

An auxiliary torsion spring 74 may be employed where necessary or desirable to work cooperatively with springs 70, tending to shift ring 46 toward registry of apertures 47 with their respective pairs of bores 54. The body of spring 74 may be received in a circular groove 76 formed in the edge of the valve ring adjacent to the end plate 22, with hooked ends 78 of the spring catching in suitable notches or recesses in the bottom of groove 76 and in the face of plate 22, to constrain rotative movement of the spring ends relative to the valve ring and plate.

In operation, with the prime mover idling at low speed the valve ring will be held by springs 70, 74 in position of Fig. 2 with its slots 47 in full registry with by-pass bores 54. No appreciable torque will be generated by the prime mover or transmitted to the load shaft because of the free circulation of fluid through the bores and valve slots, or, if the load shaft is stationary, which it may be at the low amount of torque then generated, the fluid pressures developed within the casing will be so long as to preclude loss of appreciable energy therein by way of heat losses caused by shock, eddying or friction of the fluid. Under conditions of no-load, therefore, or low operating speed, the degree of coupling is comparatively small and the prime mover may idle freely at relatively high speed, depending upon the spring-constants of the springs 70 and 74.

Should the pirme mover's speed be increased to its operating value with a normal load, by increasing its fuel supply or otherwise, the speed of the impeller casing will increase, augmenting the centrifugal force acting on the slide blocks 64. These, moving outward, will effect circumferential shifting of the valve ring 46 from the position of Fig. 2 toward that of Fig. 3, thus increasing the restriction of communication through valve slots 47 between the by-pass ports 54, and raising the pressure of the circulating fluid. Because of the progressive increase in power thus developed and transmitted from the impeller to the runner, the load will be gradually and uniformly brought up to its operating speed without shock overload in the prime mover, or need of "gear shifting" devices interposed between them. Thus, the greater load applied to the impeller by the gradual increase effected in degree of fluid coupling between impeller and rotor as the impeller attempts to accelerate, opposes and retards such acceleration, although not preventing it.

As a result, both prime mover and load, the former at first somewhat more rapidly than the latter, and then the load more rapidly than the prime mover, are gradually brought up to their normal operating speeds. At such speeds, with the valve slots out of communication with one port of each pair of by-pass ports, as shown in Fig. 3, the shafts will be coupled together almost as if integrally, there being negligible slip, if any, between impeller and runner. Moreover, in a device of this type, employing valve action, the degree of coupling between the rotating members may be substantially greater at operating speeds than with a simple vane type fluid coupling, since there a fixed close coupling would be prohibitive under idling conditions, causing large idling losses.

In the form of coupling described, the device is applicable to automobiles or other traction type apparatus, as well as in a variety of other engineering services where its dynamic operating characteristics meet the specifications, and particularly where its compactness and freedom from external fluid or mechanical connections serve usefully. As an alternative application such device might be employed in reverse as a dynamic brake, the casing being connected to the load to be braked and the rotor to a shaft to which a holding or friction force is applied.

Oftentimes it is desirable, without appreciably decreasing the degree of coupling effective at normal or operating speeds and conditions, to effect an even greater difference in permissible rotative speeds between the input and load shafts of the coupling than is possible with the device described, such as under very heavy load, high torque conditions, or under low torque conditions when the output member is nearly stopped and the speed of the prime mover is quite high. With the second form of our device, as illustrated in Figures 6 to 11 inclusive, this dynamic characteristic can be realized practically. Generally, this result is achieved by a special gearing arrangement, with the runner connected to the load shaft only effectively through a gear train acting in series with the coupling effect of the fluid link.

In this second form, the casing 100, composed of an outer ring 101 having its ends closed by circular plates 116 and 118, acts as the runner and may rotate relative to both the power input shaft 102 and the load shaft 104, and usually does. These shafts are journaled in central apertures in such end plates for free rotation relative to the casing. The power input shaft 102 is connected integrally with the rotor 106, acting as the impeller, for rotation concentrically within the circular cylindrical inner wall 108 of the casing. In this case the impeller's outer surface is generally ovate, with sliding vanes 109 at quadrature locations, projecting radially inwardly from the casing's inner wall into abutment with the peripheral surface of the impeller. These vanes are guided for such movement by stems 110 spaced lengthwise of them and projecting radially outward, which are received in bores 111 in the outer ring 101 of the casing. These vanes are urged inward into abutment with the rotor's periphery by compression springs 112 received in such bores.

In structural respects, the valve ring and by-pass passages which it controls, in this form of our device are substantially similar to these of the previously described form of device. Here, however, the by-pass passages around the sliding vanes 109 take the form of radially extending slots 113 passing through an inner ring member 114 which extends the full width of the casing between its end plates 116 and 118. Slotted valve ring 120, generally similar to valve ring 46 of the earlier described form, is guided for movement rotatively between the outer and inner ring member 101 and 114, having four rectangular slots 122 acting as valve ports and located for registry with the corresponding four groups of by-pass slots 113. The guide pins 110 which guide the movement of the vanes pass through these valve ring slots. The outer wall member 101 of the casing, clamped between the end plates, closes the outer side of the valve ring slots 122. The radial width of the vanes 109 is such that, even when in their outermost positions, their outer edges do not block excessively the connecting passages afforded by valve ring slots 122 between the by-pass slots 113 of each pair. Moreover, even though the vanes and their guide stems pass through the valve ring slots, they do not prevent sufficiently circumferential movement of the valve ring 120 to cover a slot 113.

Rotational shifting of the valve is effected here by a composite valve-actuating system including two component forms of control. The first control means functions to adjust the position of the valve ring on the basis of rotational speed of the casing acting either as impeller or runner, and thereby performs a function similar to that of the centrifugal type actuator of the first-described form of device. The second control means exerts adjusting forces on the valve ring in accordance with average fluid pressures in the coupling, and may be arranged to function only when such pressures become excessive. The valve in this particular construction is adapted to respond operatively to the resultant of both controlling effects, although either type of control could be used alone.

In applying these control effects to the circumferential positioning of the valve ring 120, as may be seen most clearly from Figures 9 and 11, the opposite sides of this ring are provided with endwise projecting nubs 130 each of which engages a diagonal slot in the groups of radially movable blocks 132, 134. Four such groups are employed, arranged in quadrature, although two circumferentially adjacent groups may be eliminated if desired. These blocks are guided for radial movement in radially extending grooves 136 recessed in the inner faces of end plates 118 and 116, respectively, as shown best in Fig. 9. Such grooves extend inwardly from their outer, open ends to the shoulders 138 of the end plates. The side edges of inner ring member 114 seat against the corresponding inner edges of these shoulders, at 139.

All of the valve ring control blocks 132, 134 tend to be moved radially outwardly by centrifugal force acting upon them, as will be explained hereafter, tending to move valve ring 120 to restrict the passage for flow of fluid through its slots 122 between by-pass slots 113, springs 140, reacting between the outer faces of corresponding blocks 132 and retainer caps 142 covering the groove openings, tend to urge them inward for shifting the valve ring in a direction to dispose its slots 122 in full registry with the corresponding by-pass slots. Added to this control effect, the differential pressures of fluid at the intakes and outlets of the respective valve passages act upon slides 134, as pistons, to provide a modifying valve control effect. The groove openings 136 receiving the slides 134, function as fluid cylinders, fluid from the valve passage intake locations passing into the outer ends of these cylinders through ducts 144 to force the valves inwardly against the lesser pressure of fluid present in the inner ends of the cylinders, which communicate through ducts 146 with the valve outlet locations, the impeller 106 being driven counterclockwise as it appears in Figure 6.

As will be explained, the casing is rotated by the prime mover through gearing. With the prime mover idling under conditions of substantially no load the casing turns slowly, the centrifugal force being comparatively small, and the valve is held open by springs 136. Upon an injection of fuel or other stimulus in the prime mover raising its speed, the speed of the casing increases correspondingly, giving rise to centrifugal force on the slides which move them progressively outwardly, gradually closing the valve passages. As a result the degree of coupling between the casing and the rotor increases in the manner described earlier.

In the case, however, with increased torque loads the resulting increased differential fluid pressure between the inlets and outlets of the by-pass passages acting on slides 134 tends to restrain the slides from being moved outwardly as far by the centrifugal force as they would otherwise be moved, so that the valves are not closed as far. Hence, for a given casing speed, the greater the torque imposed by the load the less will the by-pass passages be closed by the valve ring, thereby allowing the prime mover to develop power at a higher operating speed, and thus increasing the power capable of being developed, by increasing the slip in the fluid coupling. In this way also, sudden increases in load are cushioned even more effectively by the coupling and cannot exert a strain on the prime mover.

With reference to the gearing feature, impeller 106 has a central cylindrical bore of large diameter, around the inner periphery of which gear teeth 148 are formed, constituting a ring gear meshing with planetary gears 150, four being shown located at points spaced in quadrature about and meshing with a central "sun" gear 152 at the hub of the assembly. Planetary gears 150 are free to rotate on their respective supporting shafts 154, which shafts are integral with the casing or runner and rotate orbitally with it. Central gear 152 is connected integrally to the output, or load, shaft 104, and the entire assembly constitutes a form of differential transmission contained completely within the casing, as are all other components of the fluid coupling.

The casing always turns at a speed between the speeds of shafts 102 and 104, except when they are all locked together by closure of the fluid by-passes to turn at the same speed. Depending upon the relative radii of the sun gear and the ring gear, the difference in speed between the shafts 102 and 104 for a given slip may be selected. The less the radii differ, the more nearly will be the speed of the casing approach the average speed between the speeds of shafts 102 and 104. If it is desired to have the casing turn more rapidly than this average speed, the input shaft should be connected to the ring gear 148, in which case the greater the difference between the radii of the sun and ring gears the more nearly will the speed of the casing approach the speed of the input shaft for a given speed relationship between the input and output shafts. If, on the other hand, it is desired that the casing turn more slowly than the average speed between the input and output shafts, in order to afford a higher idling speed of the prime mover for a given slip in the coupling and a greater mechanical advantage, the input shaft will be connected to the sun gear 152, being shaft 104, and the output shaft will be connected to the ring gear 148, being shaft 102. In this event the greater the difference in radii of the sun gear and the ring gear, the more slowly will the casing be driven for a given speed relationship between the input and output shafts.

It will be seen, therefore, that with this mechanism a very wide range of drive ratios between the input shaft and the casing may be obtained merely by selecting the sizes of the sun gear and ring gear appropriately, and by connecting the input shaft to one or the other. For any predetermined relative speed of the input and output shafts a selected speed of the casing may be obtained. When the load shaft is stationary the casing will, of course, also be driven at a predetermined value with relation to the speed of the input shaft. In that situation the rotation of the casing should be sufficiently slow at idling speed of the prime mover so that the centrifugal force on the valve ring control blocks 134 will not be great enough to shift the valve ring to close the by-pass passages at all, and no appreciable fluid coupling pressures are developed between the impeller and runner.

For example, with the fluid coupling forces effectively zero, as when the by-pass passages are open, assuming load shaft 104 is stationary and input shaft 102 is driven at the idling speed of the associated prime mover, casing 100 will be caused to rotate in the same direction but at a predetermined fraction of the speed of shaft 102. This speed ratio remains unaltered throughout variations in speed of shaft 102, with shaft 104 stationary. Thereby the operational advantage is achieved of enabling the prime mover to idle relatively rapidly, with the load shaft stationary, without as great a difference in rotative speeds of impeller and runner as exists between impeller and load shaft, reducing loss of energy in the fluid and minimizing prime mover power consumption under idling conditions. Were the runner connected directly to the load shaft, as with the earlier-described form of our invention, the losses under such operating conditions would be considerably higher.

The moment input power to the prime mover rises, however, increasing the speed of the impeller and thereby of the casing (runner), as a result of the gearing, centrifugal action overcomes the force of the springs 140 pressing blocks 132 inward, to close progressively the by-pass passages 113, giving rise to fluid coupling forces in forcing the fluid through the passages thus restricted, which alter the basic speed ratios between the parts and cause load shaft 104 to rotate. As the speed of the input shaft increases, and with it the coupling forces, the speeds of both the casing and of the output shaft approach that of the input shaft 102 until, under normal conditions of speed and load, the casing rotates only slightly slower than the impeller, determined by the slip, and load shaft 104 only slightly slower than the casing. Since the by-pass passages are then nearly closed and the slip is relatively inappreciable, load shaft 104 and input shaft 102, to all intents and purposes, rotate in unison, as desired, whereas they rotate at widely different rates under heavy torque conditions with the load shaft turning very slowly. The resultant effect of the composite valve control mechanism operating conjunctively with the gear mechanism provides operating advantages according to both described effects, with slip losses small as compared to those present in a fluid coupling of the type first described, without gearing, and very small as compared to those in a simple vane type coupling.

In the further modified form of our improved coupling device illustrated in Figures 12 to 14, inclusive, actuation of the control valve ring is effected by fluid pressure, with or without centrifugal effects, and preferably in opposition to return springs, as may be desired in various specialized applications. An increase in the fluid pressure effects wider opening of the by-pass passages, and the springs tend to move the valve to close these passages. Such an application might be one where the device is employed as a shock-absorbing, power transmission element interposed in a load shaft which is subject to undesired heavy intermittent strain from which the driving or other apparatus connected to the load must be protected. In the operation of the coupling in such application the normal torque which it transmits may be accompanied by such fluid pressures in the casing as will effect movement of the valve to open the by-pass passages only slightly, but with the occurrence of undesired shock loads, which may be damaging to the connected apparatus, or merely of a sustained, unusually heavy load, the inevitable increase in fluid pressure effects movement of the valve ring to increase the opening through the by-pass passages to relieve such pressure. If the connected apparatus constitutes a prime mover, such relief of by-pass restriction enables it to develop the necessary power to meet the increased load, however protracted it may be, at an appropriate speed. If desired, the inherent centrifugal effect on certain control parts, as in the earlier-described forms, may be relied upon to modify the type of control utilized.

Thus such a device, in the main, preferably comprises a form of impeller and rotor generally of either type already described in detail, with certain minor modifications of the casing structure to incorporate modified valve ring actuating means. Accordingly, only a portion of the casing element is shown in Figure 12, comprising an outer shell or ring wall 160, an inner ring wall 162 having an ovate cylindrical cavity 164, and by-pass passages 166 located at opposite ends of its minor axis and communicating therewith and with the slot 168 formed in the valve ring 170, substantially as in the form of Figures 2 and 3, inserted between such inner and outer rings. The rotor member carrying the vanes cooperating with the casing is not shown, it being understood that the vanes may be constructed and arranged much as in the manner of Figures 2 and 3. The casing end walls 169 and 171 appear in Figure 13.

Here, at locations in the casing between the valve passages, radially disposed fluid cylinders 172 are formed, receiving valve ring controlling pistons 174. The piston sleeves 172 pass through appropriate slots 173 in valve ring 170. To lengthen the available stroke of the pistons the cylinder walls project outwardly beyond the general surface of the outer casing wall and are closed by apertured sealing caps 176. A fluid pipe 178 connects the outer end of each cylinder with a high pressure point 180 in an adjacent inlet port of a by-pass passage to enable high pressure fluid to flow into the cylinder, acting against the outer end of the piston 174. A low pressure fluid duct 182 passing through the inner wall section 162 communicates between the inner end of each cylinder, and a point 184 in the low pressure side of an adjacent valve passage.

Helical springs 186 seating against the inner end of the cylinders react against the inner ends of pistons 174 to urge them outwardly, maintaining the valve ring in position normally to close the by-pass passages as a result of the action of connecting pins 188 anchored in valve ring 170 extending through and sliding in diagonal slots 190 in the piston walls. In operation, the spring thrust, holding the valve normally closed, is overcome progressively by increase in fluid pressure, which occurs with increased torque. Any centrifugal force of the pistons 174 works in opposition to fluid pressure urging them inwardly.

When applying this form of coupling in the transmission of power, for example in an automobile, it may be desired to supply clutching mechanism connected in the drive shaft, in series with the coupling, to enable the automobile engine to be started without load, to idle freely, and to gain speed before applying its power to the traction wheels. Otherwise the high degree of coupling in the device at speeds of the engine where it develops low torque, as when the engine idles, would tend to stall the engine. The clutch, if desired, could be of the automatic type, such as one engageable by centrifugal force and released when the prime mover speed drops below a predetermined value, the yield of the fluid and the valve ring reaction taking up dynamically any shock which might tend to develop when the clutch is first engaged. In this form of coupling, so applied, it is obvious that if centrifugal force is employed as a control factor such force will be minimum at idling speeds, hence pistons 174 will then be urged into valve-closing positions by such force to a lesser degree than at higher speeds. Any fluid pressure developed at idling speed is therefore more effective to relieve itself by opening the valve and there will be, in that type of design, less tendency to stall the engine by overloading under low speed conditions. Stated differently, if centrifugal force is a major control factor the stiffness of spring 186 may be reduced, more or less to the extent compensated by centrifugal force with which it works to urge the piston outwardly. Hence at idling speeds it will be easier for load torque, producing fluid pressure, to relieve itself by opening the valve.

In Figure 15 an alternative modified form of coupling control is illustrated, wherein the compression spring 186' acts, in this case, inwardly against the outer end of piston 174, to lend a different operating characteristic to the device. The fluid ducts are also reversely connected, a high pressure duct 178' leading to the inner end of cylinder 172' and low pressure conduit 182' communicating with the outer end of such cylinder. By this arrangement, the valve is held open by springs 186' when torque, hence fluid pressure, is low, and is closed progressively by increases in such pressure. One application of such device is as a power transmission coupling in a constant speed load system, wherein increases in load only couple together more tightly the load shaft and input shaft to maintain the load's speed constant. This may be desired in applications where the prime mover is an electric motor fully capable of developing much more than its rated power under temporary overloading and where its characteristic is to be employed gainfully to keep load speed constant.

In either of these latter two forms or variations the effect of centrifugal force may obviously be minimized by light weight pistons, or eliminated by any suitable counteracting means of which there are known types, urging the pistons inwardly with increase in rotative speed. In such case the casing or the rotor may act interchangeably as runner and impeller, without material operating differences. Alternatively, the effect of centrifugal force may be utilized, as in the earlier-described forms, separately or in combination with the effect of fluid pressure, to control the degree of coupling by positioning of valve 170, as previously mentioned. It will be understood that various combinations of the effects of fluid pressure, centrifugal force and resilient spring reaction may be utilized to achieve a variety of operating characteristics in a mechanism of the type described and that the combination selected is largely a matter of design consideration determined by a particular set of operating requirements.

We claim as our invention:

1. A fluid coupling comprising generally concentric rotary impeller and runner members, one of said members, being the outer, having therein a fluid-containing cavity and the other member being received rotatably in such cavity, fluid pumping means associated with said members operatively to force fluid peripherally between them by relative rotation thereof, means disposed between the peripheries of such members defining a restriction to such peripheral flow of fluid, a by-pass passage in said outer member communicating between peripherally spaced points on the periphery of its cavity at opposite sides of such restriction, an annular groove formed within the outer member intersecting to by-pass fluid around such restriction, said by-pass therein, a ring-shaped valve received in said groove for circumferential shifting therein, intersecting said by-pass passage, and having therein an opening registerable with said by-pass passage at its intersection therewith, operable to open progressively said by-pass passage by circumferential shifting of said valve ring, and means operatively connected to said valve ring and operable to shift it circumferentially and progressively for varying the flow of fluid through said by-pass passage automatically in response to force produced by rotation of at least one of said fluid coupling members.

2. The fluid coupling defined in claim 1 wherein the by-pass passage comprises a pair of circumferentially spaced, generally radial bores communicating between the valve-receiving groove and the fluid-receiving cavity.

3. A fluid coupling as defined in claim 1, in which the valve-shifting means includes means operable automatically by centrifugal force to shift the valve ring in response to change in rotational speed of the outer rotary member carrying the valve ring.

4. A fluid coupling as defined in claim 3, and spring means operable to resist such shifting of the valve ring.

5. A fluid coupling as defined in claim 3, in which the valve-shifting means shifts the valve ring to effect opening of the by-pass passage progressively with increases in speed of the outer rotary member carrying such valve ring.

6. A fluid coupling as defined in claim 1, in which the valve-shifting means includes means operable automatically in response to change in pressure of the fluid in the fluid cavity to shift the valve ring progressively as the difference in pressures of fluid at locations corresponding to the inlet and outlet portions of the by-pass passage varies.

7. A fluid coupling as defined in claim 1, in which the valve-shifting means includes means operable automatically in respones to change in pressure of the fluid in the fluid space to shift the valve ring progressively as fluid pressure generated dynamically in the fluid space cavity varies.

8. A fluid coupling as defined in claim 7, in which the valve-actuating means comprises a member carried by the outer rotary member movable progressively inwardly by pressure of fluid.

9. A fluid coupling as defined in claim 7, in which the valve-actuating means comprises a member carried by the outer rotary member movable progressively outwardly by pressure of fluid.

10. A fluid coupling as defined in claim 7, in which the valve-actuating means additionally includes means controlled automatically in response to centrifugal force produced by rotation of the outer of the members, which carries the valve ring, for shifting the valve ring circumferentially progressively in response to the combined effects of fluid pressure and centrifugal force.

11. The fluid coupling defined in claim 10 wherein the means responsive to centrifugal force and the means responsive to fluid pressure act in mutual opposition to control shifting of the valve ring.

12. A fluid coupling comprising impeller and runner members, one such member having therein a cavity and the other member being received within such cavity, one of the adjacent peripheries of such members being ovate and the other periphery circular, defining fluid spaces between them, the circular of said members carrying a plurality of vanes having their ends slidably contacting the adjacent peripheral surface of the other such member, operable to force fluid in said spaces peripherally into the ends thereof by relative rotation of said members, a plurality of by-pass passages in the outer of said members, each communicating between adjacent ends of adjacent fluid spaces, an annular groove formed in the outer member intersecting said by-pass passages, a valve ring received in said groove to intersect said by-pass passages and having slots registerable with said passages and operable to open progressively said passages conjointly by shifting said valve ring circumferentially, to control flow of fluid through said passages and thereby between said spaces, and valve actuating means carried by said outer member and operable to shift said valve ring circumferentially and progressively in response to variations in rotational speed of said outer member, said actuating means comprising a slider movable generally radially therein by centrifugal force, means operable to resist such movement of said slider, and means operatively interconnecting said slider and valve ring to effect such shifting of said valve ring.

13. A coupling as defined in claim 12, in which movement of the slider occasioned by centrifugal force effects movement of the valve in a direction to increase the restriction of the by-pass passages, and wherein the resisting means comprises a spring urging the valve ring toward open position.

14. A fluid coupling comprising rotary impeller and runner members, one of said members forming a fluid casing, and the other of said members being received within said casing, the adjacent peripheral surfaces of said members defining a plurality of fluid spaces, vanes carried by one of said members extending through said spaces into sliding contact with the adjacent periphery of the other of said members, valve means carried by one of said members and operable to by-pass fluid driven by the impeller against the runner, to relieve the pressure of such driven fluid in controlled manner, and valve actuating means carried by one of said members within the casing and operable to regulate said valve directly and progressively in response to variations in pressure of the driven fluid to regulate such pressure as a function of increasing load on the coupling, said valve actuating means comprising piston and cylinder means operatively connected to said valve means, and communicating with the body of fluid medium in the casing to exert a force urging the piston and cylinder to move relatively in one direction, and spring means interengaged between the piston and cylinder and urging them to move relatively in the opposite direction.

15. A fluid coupling comprising cylindrical impeller and runner members mounted concentrically for relative rotation, one within the other, the inner such member having a generally ovate peripheral surface and the outer such member having a substantially circular inner surface, said surfaces defining opposing crescent-shaped fluid spaces between them, a plurality of circumferentially spaced vanes projecting inwardly from said outer such member into slidable engagement with the adjacent surface of said inner member across the fluid spaces, respectively, a plurality of by-pass passages in said outer member communicating at their opposite ends between different fluid spaces, through which fluid may flow upon relative rotation of said members, the communicating points of each such passage with said spaces lying on opposite sides of a vane, and valve means operable to regulate progressively the flow through said passages conjointly, said valve means comprising an annular recess formed in said outer member and communicating at different points serially with said by-pass passages, and a valve ring received in said recess and having slots therein adapted to register with said passages, at points of communication between said recess and passages, and valve-actuating means operable to effect regulation of the flow of fluid through the by-pass passages as a function of a dynamic operating condition of the coupling.

16. A fluid coupling as defined in claim 15, and valve-actuating means operable to effect progressive regulation of the volume of fluid flowing through the by-pass passage, said actuating means being responsive to pressures of fluid in the fluid spaces.

17. A fluid coupling as defined in claim 16, and further valve-actuating means coacting with the first said such fluid means, operable to affect the position of the valve in accordance with rotative speed of the outer member, said further means comprising a slide movable outwardly radially within the outer member by centrifugal force, and slot and pin means interconnecting the valve ring and said slide to effect conversion of such slide movement into rotative movement of the valve ring.

ROY VAN ALSTYNE.
EDGAR J. ROTHCHILD.

REFERENCES CITED

The following references are of record in the file of this patent:

UNITED STATES PATENTS

| Number | Name | Date |
| --- | --- | --- |
| 929,556 | Clifton | July 27, 1909 |
| 1,105,792 | Jessen | Aug. 4, 1914 |
| 2,115,244 | Sanage | Apr. 26, 1938 |

Certificate of Correction

Patent No. 2,526,175 October 17, 1950

ROY VAN ALSTYNE ET AL.

It is hereby certified that error appears in the printed specification of the above numbered patent requiring correction as follows:

Column 18, line 33, before the word "a" strike out "and"; line 44, for "passage" read *passages*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*